United States Patent
Shaikh

(10) Patent No.: US 11,852,276 B2
(45) Date of Patent: Dec. 26, 2023

(54) INSULATED PIPE SUPPORT

(71) Applicant: LISEGA, Inc., Kodak, TN (US)

(72) Inventor: Perwez Daud Shaikh, Sugar Land, TX (US)

(73) Assignee: Lisega, Inc., Kodak, TN (US)

( * ) Notice: Subject to any disclaimer, the term of this patent is extended or adjusted under 35 U.S.C. 154(b) by 0 days.

(21) Appl. No.: 16/859,630

(22) Filed: Apr. 27, 2020

(65) Prior Publication Data
US 2021/0332934 A1  Oct. 28, 2021

(51) Int. Cl.
*F16L 59/135* (2006.01)
*F16L 3/12* (2006.01)
*F16L 3/137* (2006.01)

(52) U.S. Cl.
CPC ......... *F16L 59/135* (2013.01); *F16L 3/1226* (2013.01); *F16L 3/137* (2013.01)

(58) Field of Classification Search
CPC ......... F16L 3/1226; F16L 3/137; F16L 3/123; F16L 3/1223; F16L 3/13; F16L 3/233; F16L 3/2336; F16L 3/2338; F16L 3/223; F16L 3/229; F16L 59/135
USPC ......... 248/71, 72, 73, 74.3, 74.1, 67.7, 68.1; 138/106
See application file for complete search history.

(56) References Cited

U.S. PATENT DOCUMENTS

| | | | | |
|---|---|---|---|---|
| 1,470,529 A | * | 10/1923 | Gerber | F16L 3/18 248/49 |
| 1,853,736 A | * | 4/1932 | Lawrence | F16L 59/135 285/61 |
| 2,761,714 A | * | 9/1956 | Cuskie | B60G 21/0551 403/225 |
| 3,241,800 A | * | 3/1966 | Richter, III | F16B 2/08 248/230.9 |
| 3,295,806 A | * | 1/1967 | Modeme | F16L 3/1008 248/74.4 |
| 3,894,707 A | * | 7/1975 | Heard | G09F 7/18 248/230.9 |
| 3,963,205 A | * | 6/1976 | Hageman | F16L 3/00 248/55 |
| 4,094,487 A | * | 6/1978 | Heard | G09F 7/18 248/230.9 |
| 4,199,310 A | * | 4/1980 | Phipps | B29C 44/3407 425/71 |
| 4,251,844 A | * | 2/1981 | Horstmann | G01R 19/145 361/1 |
| 4,921,191 A | * | 5/1990 | Herschler | F16L 3/006 248/70 |

(Continued)

*Primary Examiner* — Nkeisha Smith
(74) *Attorney, Agent, or Firm* — Baker Donelson Bearman Caldwell & Berkowitz, PC

(57) ABSTRACT

An insulated pipe support includes a base, a thermal insulation block, a cradle plate, and a mounting strap. The base has two side rails each having a strap mounting flange with a strap passage therein. The insulation block is configured to fit upon the base between the side rails. The cradle plate has main portion and two vertical end portions having a curved cradle which conforms to the exterior of an insulated pipe. The mounting strap includes two oppositely disposed mounting ends which are configured to extend through the strap passage of the lugs. Six threaded studs with matching nuts extend from the base, through the insulation block and cradle plate to secure the position of each.

15 Claims, 3 Drawing Sheets

(56) References Cited

U.S. PATENT DOCUMENTS

| | | | | |
|---|---|---|---|---|
| 5,028,020 A * | 7/1991 | Sundholm | F16L 3/18 | 248/74.4 |
| 5,765,944 A * | 6/1998 | Fallon | F16L 3/13 | 362/217.1 |
| 5,924,656 A * | 7/1999 | Okada | F16L 3/00 | 248/73 |
| 6,105,216 A * | 8/2000 | Opperthauser | F16L 3/243 | 24/459 |
| 6,142,428 A * | 11/2000 | Kamata | F16L 3/1207 | 248/49 |
| 6,968,864 B2 * | 11/2005 | Miyamoto | B60R 16/0215 | 138/108 |
| 7,784,743 B2 * | 8/2010 | Zeuner | F16L 3/123 | 248/63 |
| 7,997,541 B2 * | 8/2011 | Pothanikat | F16L 55/035 | 248/74.1 |
| 8,398,033 B2 * | 3/2013 | Booth | H02G 7/053 | 248/63 |
| 8,943,813 B2 * | 2/2015 | Kamei | E02F 9/0866 | 60/311 |
| 8,985,533 B2 * | 3/2015 | Edmond | F16L 3/1222 | 248/68.1 |
| 9,447,899 B2 * | 9/2016 | Minami | F16L 5/025 | |
| 9,464,734 B2 * | 10/2016 | Okura | H02G 3/22 | |
| 9,482,370 B2 * | 11/2016 | Hobson | H02G 3/32 | |
| 9,810,021 B2 * | 11/2017 | Sylvester | H02G 3/32 | |
| 10,107,419 B2 * | 10/2018 | Anderson | F16L 3/243 | |
| 10,247,330 B2 * | 4/2019 | Hargrave | F16L 55/035 | |
| 10,584,902 B2 * | 3/2020 | Ros Ruiz | H02S 20/32 | |
| 10,731,778 B2 * | 8/2020 | Brouwer | F16L 3/23 | |
| 2003/0094547 A1 * | 5/2003 | Wilkinson, III | F16L 3/137 | 248/74.1 |
| 2013/0048798 A1 * | 2/2013 | Bock | F16L 59/123 | 248/67.5 |
| 2015/0059826 A1 * | 3/2015 | Reed | F24S 30/425 | 136/246 |
| 2017/0234580 A1 * | 8/2017 | Worden | F24S 30/425 | 126/606 |

* cited by examiner

INSULATED PIPE SUPPORT

CROSS REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

TECHNICAL FIELD OF THE INVENTION

The present inventive concept relates to the field of pipe supports. More particularly, the invention relates to a pipe support used with insulated pipes.

BACKGROUND OF THE INVENTION

Supports for holding piping are well known in the form of hangers depending downwardly from the ceiling or brackets place on a support surface such as the ground. These types of supports are adequate for normal piping. However, when the piping conveys cryogenic fluids, which may be liquified natural gas at a temperature of approximately minus 265 degrees Fahrenheit, such supports are not appropriate. Cryogenic pipe supports used to support cryogenic pipes must be adapted for use with heavily insulated pipes to prevent thermal migration to or from the pipe.

Therefore, pipe supports have also been specifically designed to support cryogenic pipes. These cyrogenic pipe supports includes an inverted T-shaped bracket which is welded along the top edge of the vertical portion to the cryogenic pipe. The T-shaped bracket may also include an elongated U-shaped portion which cradles the pipe along the entire length of the pipe support. These T-shaped brackets are coupled to an insulator block which in turn is coupled to a base. The problem with this design is that the bracket is mounted to the pipe along its entire length, which creates a large thermal conduction pathway from the pipe to ambience.

Another problem with this type of support is that the cryogenic pipe is wrapped with a thick thermally insulating layer which is then covered with a metallic cladding. The metallic cladding is overlaid with mounting bands or straps which are coupled to the underlying base to secure the pipe to the pipe support. To mount the straps to the base, holes are drilled into the base and the strap is passed through these holes. This method of securing the mounting straps is time consuming and inefficient.

Accordingly, it is seen that a need remains for an insulated pipe or cryogenic pipe support that can quickly be mounted to an insulated cryogenic pipe without decreasing the thermal insulation qualities of combination. It is to the provision of such therefore that the present invention is primarily directed.

BRIEF SUMMARY OF THE INVENTION

In a preferred form of the invention, an insulated pipe support for use with an insulated pipe having a thermal insulation positioned about the insulated pipe and cladding positioned about the insulation comprises a base having a top surface, a first longitudinal side edge, and a second longitudinal side edge. The base has a first strap mounting flange positioned proximal the first side edge and a second strap mounting flange positioned proximal the second side edge. The insulated pipe support also has a a thermal insulator block coupled to the base and positioned between the first strap mounting flange and the second strap mounting flange, a cradle plate coupled to the thermal insulator block oppositely disposed from the base, and at least one mounting strap sized to wrap about the cladding. The mounting strap has a first end coupled to the first strap mounting flange and a second end coupled to the second strap mounting flange.

In another preferred form of the invention, an insulated pipe support for use with an insulated pipe having a thermal insulation about the insulated pipe and cladding positioned about the insulation comprises a base having a top surface, a thermal insulator block, a cradle plate positioned upon to the thermal insulator block having a main portion and two oppositely disposed end portions extending upwardly from the main portion and having curbed cradles to receive the cyrogenic pipe, and at least one mounting strap sized to wrap about the cladding. The mounting strap has mounting ends coupled to the base.

DETAILED DESCRIPTION OF CERTAIN EMBODIMENTS

Definitions

Figure 1:
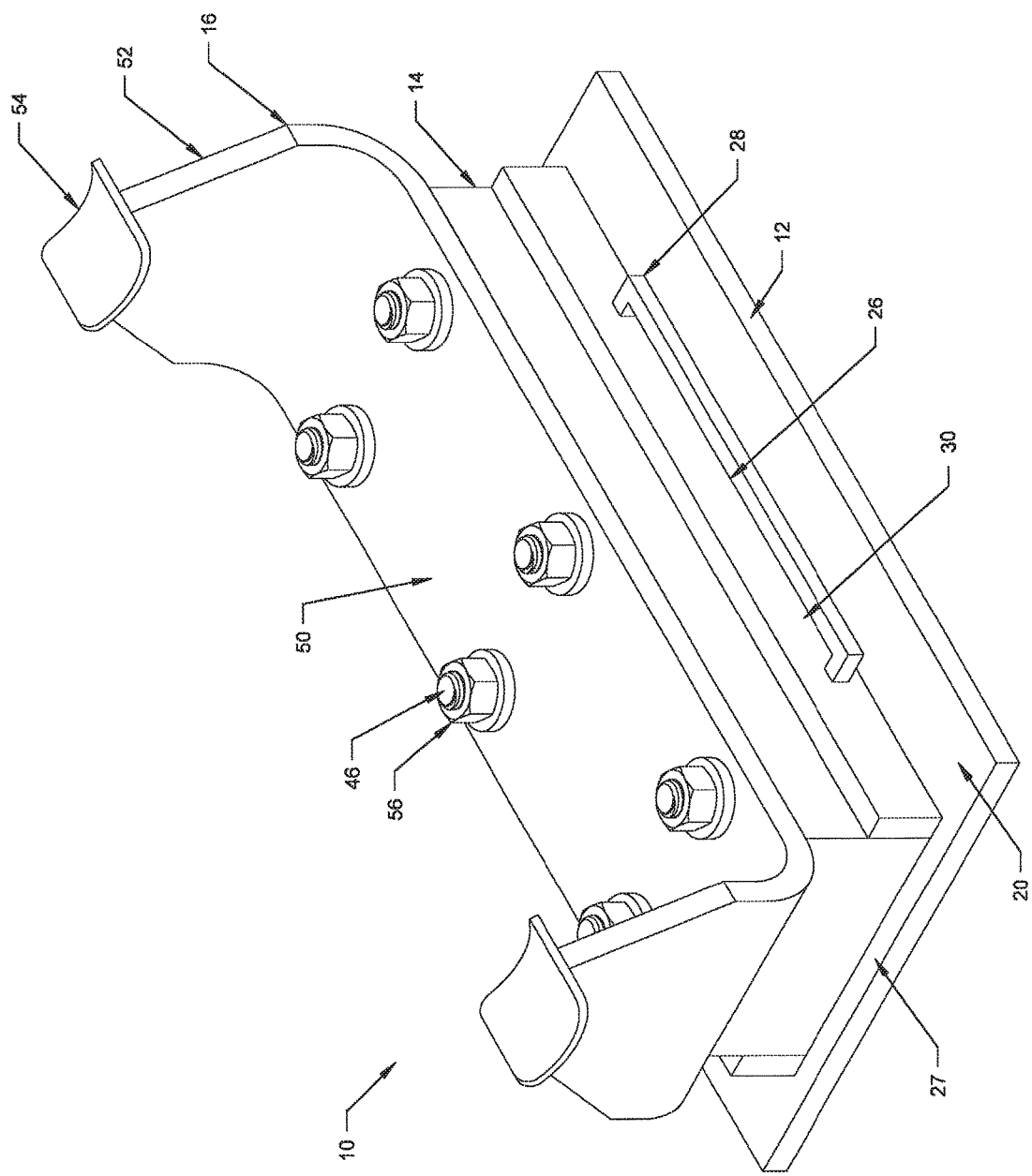
FIG. 1 is a perspective view of an insulated pipe support embodying principles of the invention in a preferred form.
Figure 2:
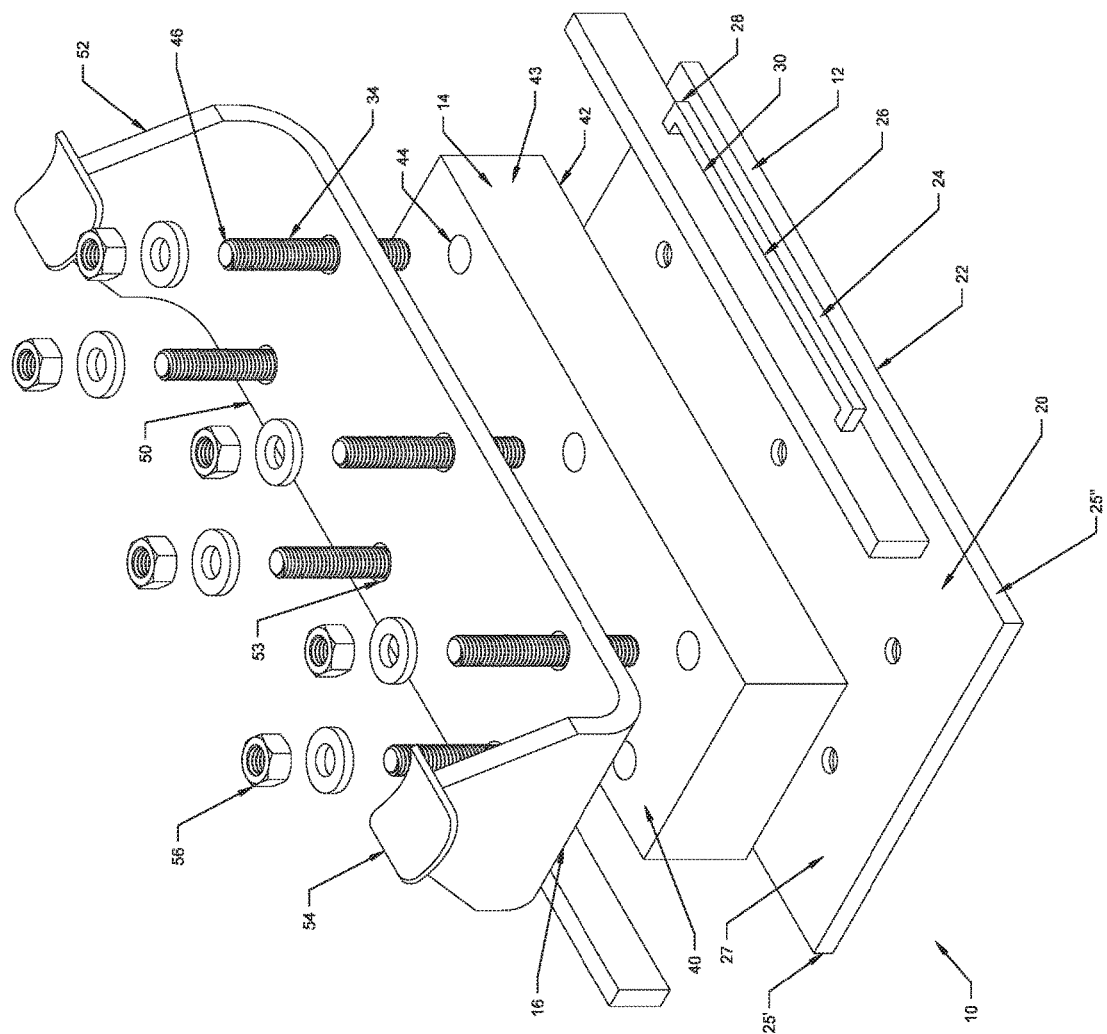
FIG. 2 is an exploded perspective view of the insulated pipe support of FIG. 1.

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Description of Selected Specific Embodiments

With reference next to the drawings, there is a shown an insulated cryogenic pipe support 10 in a preferred embodiment, referenced hereinafter as pipe support 10. The pipe support 10 is coupled to an insulated pipe P wrapped within a cylindrical thermal insulation I which in turn is overlaid with a metallic cladding C. The pipe P, insulation I and cladding C are of conventional construction and materials. The pipe support 10 includes a platform or base 12, a thermal insulation block 14, a cradle plate 16, and a mounting band or strap 18.

The base 12 includes a bottom plate 20 having a bottom surface 22, an oppositely disposed top surface 24, a first side edge 25', and a second side edge 25". The base also includes two parallel, upwardly and longitudinally extending side rails 26 which are laterally separated from each other to define a space 27 therebetween. Each side rail 26 has an elongated, horizontally and outwardly extending mounting flange or lug 28 having a strap passage 30 therethrough. The mounting lug 28 of one side rail 26 is positioned proximal the first side edge 25' while the oppositely disposed mounting lugs 28 of the other side rail 26 is positioned proximal the second side edge 25", i.e., the mounting lugs 28 are laterally separated from each other by the side rails 26 and the space 27 therebetween. The base 12 also has six threaded studs or bolts 34 fixedly mounted to the bottom plate 20 and extending upwardly from the top surface 24 of the bottom plate 20. The base bottom plate 20 and rails 26 are preferably unitary in construction and made of a thermoplastic material.

The insulation block 14 has a generally rectangular prism or cuboid shape with a top surface 40 and an oppositely disposed bottom surface 42 with side walls 43 extending therebetween. The insulation block 14 also has six bolt holes 44 extending therethrough from the bottom surface 42 to the top surface 40. The six bolt holes 44 are configured to align with and receive the six threaded studs 34, such that the studs 34 have a top portion 46 that extends outwardly from the top surface 40. The insulation block 14 is sized and shaped to fit upon the base top surface 24 and be nested between the side rails 26. The insulation block 14 is made of a thermosetting plastic such as that sold under the brand name Micarta owned by Industrial Laminates/Norplex, Inc. of Postville, Iowa.

The cradle plate 16 has a generally planar, horizontal main portion 50 and oppositely disposed ends from which extends vertical end portions 52. The main portion 50 has six bolt mounting holes 53 which are configured to align with the six studs 34 and the six bolt holes 44 of the insulation block 14. An arcuate or curved pipe platform or cradle 54 is mounted to the top of each end portion 52. The curvature of the cradle 54 is selected to conform to the exterior circumference or curvature of the insulated pipe P coupled to the pipe support 10. An internally threaded nut 56 is threaded onto the stud top portion 46 and into abutment with the cradle plate 16 to lock the relative positions of the cradle plate 16 and insulation block 14 upon the base 12. The cradle plate 16 may be made of a metal such as aluminum or stainless steel.

The mounting strap 18 is configured to fit about the exterior periphery of the cladding C. The elongated mounting strap 18 includes two oppositely disposed mounting ends 58 which are configured to extend through the strap passage 30 of the lugs 28. A stop or fastener 60 is mounted to the mounted ends 58 extending from the lugs 28 to lock the mounting strap 18 in place and prevent the strap mounting ends 58 from moving back through the lugs 28. The mounting straps 18 are preferably made of a metallic material such as stainless steel.

Figure 3:
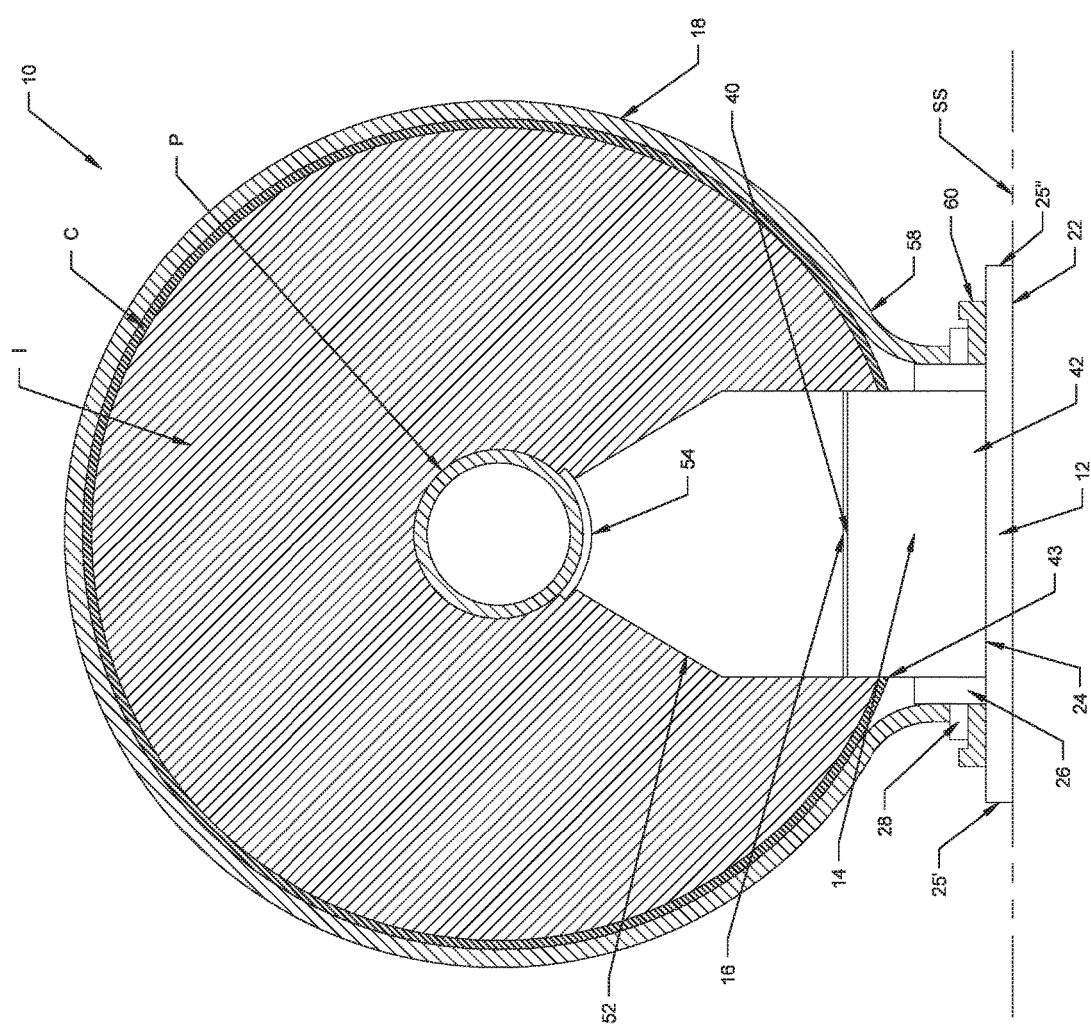
FIG. 3 is an end view of the insulated pipe support of FIG. 1.

In use, the pipe support 10 is positioned upon a supporting surface SS, such as a metal pipe rack or concrete floor, at a height so that the insulated pipe P contacts the U-shaped cradles 54 and is supported by the pipe support 10, as shown in FIG. 3. The insulated pipe P is then welded to the cradles 54. It should be noted that even though the insulated pipe P is welded to the cradles, and therefore the pipe support 10, pipe movement during thermal expansion and contraction may still occur as the pipe support 10 is able to slide upon the underlying supporting surface SS.

The insulated pipe P is then wrapped with the insulation I and cladding C. The mounting straps 18 are then positioned about the exterior of the cladding C. The mounting ends 58 of the mounting straps 18 are passed through the strap passages 30 of the lugs 28 and locked in place so that the mounting straps 18 tightly conform to the cladding C in order to bind the insulation I and cladding C to the pipe support 10. The mounting ends 58 of the straps are locked in place relative to the base 12 through any known method, such as through the use of the stop or fastener 60, or in the alternative, by bending or folding the mounting ends 58 of the mounting strap to prevent movement back through the lugs 28. Thus, the mounting straps 18 are quickly and efficiently mounted to the base 12 without the need of drilling mounting holes in the base, a problem associated with pipe supports of the prior art.

The pipe P typically has a diameter in the range of between 2 inches and 30 inches, while the insulation I surrounding the pipe P may have a thickness of 4 to 12 inches. With this configuration, the insulated pipe support 10 has a base length of approximately 12⅝ inches and a width of approximately 7½ inches. Preferably, the cradle plate 16 has the end portions 52 spaced apart approximately 1 foot 2⁵⁄₁₆ inches. The height of the end portions 52 may vary to accommodate the thickness of the insulation. Therefore, the height of the end portions 52 preferably may be between 6 and 14 inches.

In a preferred from of the invention, an insulated pipe support 10 for use with an insulated pipe P having a thermal insulation I positioned about the insulated pipe and cladding C positioned about the insulation comprises a base 10 having a top surface 24, a first longitudinal side edge 25', and a second longitudinal side edge 25". The base 10 has a first strap mounting flange 28 positioned proximal the first side edge 25' and a second strap mounting flange 28 positioned proximal the second side edge 25". The insulated pipe support 10 also has a thermal insulator block 14 coupled to the base 10 and positioned between the first strap mounting flange 28 and the second strap mounting flange 28, a cradle plate 16 is coupled to the thermal insulator block 14 oppositely disposed from the base 12, and at least one mounting strap 18 sized to wrap about the cladding. The mounting strap 18 has a first end 58 coupled to the first strap mounting flange 28 and a second end 58 coupled to the second strap mounting flange 28.

A pair of spaced apart longitudinal side rails 26 extend upwardly from the top surface 24 of the base 12.

The first strap mounting flange 28 extends outwardly from one side rail 26 while the second strap mounting flange 28 extends outwardly from the other said side rail 26.

The cradle plate 16 includes a main portion 50 and two oppositely disposed end portions 52 extending upwardly from the main portion 50. Each end portion 52 includes a curved cradle 54 sized to receive the cyrogenic pipe.

The base 12 has a plurality of threaded studs 34 extending upwardly from the top surface 24, wherein the insulation block 14 includes a plurality of mounting holes 44 aligned to receive the plurality of threaded studs 34, wherein the cradle plate 16 includes a plurality of mounting holes 53 aligned to receive the plurality of threaded studs 34, and a plurality of threaded nuts 56 are mounted upon the plurality of threaded studs 34 to lock the position of the insulation block 14 and cradle plate 16 to the base 12.

In another preferred form of the invention, an insulated pipe support 10 for use with an insulated pipe P having a thermal insulation I about the insulated pipe and cladding C positioned about the insulation comprises a base 12 having a top surface 24, a thermal insulator block 14, a cradle plate 16 positioned upon to the thermal insulator block 14 having a main portion 50 and two oppositely disposed end portions 52 extending upwardly from the main portion 50 and having curved cradles 54 to receive the cyrogenic pipe, and at least one mounting strap 18 sized to wrap about the cladding. The mounting strap 18 has mounting ends 58 coupled to the base 12.

It should be understood that the insulation block 14 restricts thermal conduction from the pipe P and cradle plate 16 to ambience.

It should be understood that as an alternative, the mounting flanges or lugs 28 may extend from the base top surface 24.

It should be understood that the mounting flange or lug 28 of each side rail 26 may be in the form of a plurality of lugs rather than one single elongated lug.

Lastly, it should be understood that by separating the two cradles 54, the pipe support provides a more stable connection between it and the cyrogenic pipe P while also reducing the length of the contact area between the cyrogenic pipe and the cradle plate as compared to the cyrogenic pipe supports of the prior art wherein these components were welded to each other along their entire longitudinal length of the cyrogenic pipe support.

While this invention has been described in detail with particular references to the preferred embodiments thereof, it should be understood that many modifications, additions and deletions, in addition to those expressly recited, may be made thereto without departure from the spirit and scope of the invention as set forth in the following claims.

The invention claimed is:

1. An insulated pipe support for use with an insulated pipe having a thermal insulation positioned about the insulated pipe and cladding positioned about the insulation, said cyrogenic insulated pipe support comprising:
   a base having a top surface, a first longitudinal side edge, and a second longitudinal side edge, said base having a first strap mounting flange positioned proximal said first side edge and a second strap mounting flange positioned proximal said second side edge;
   a thermal insulator block coupled to said base and positioned between said first strap mounting flange and said second strap mounting flange;
   a cradle plate coupled to said thermal insulator block oppositely disposed from said base and thermally isolated from said base by said thermal insulator block, said cradle plate being configured to be mounted to an insulated pipe, and
   at least one mounting strap sized to wrap about the cladding, said mounting strap having a first end coupled to said first strap mounting flange and a second end coupled to said second strap mounting flange.

2. The cyrogenic insulated pipe support of claim 1, wherein said base includes a pair of spaced apart longitudinal side rails extending upwardly from said top surface.

3. The cyrogenic insulated pipe support of claim 2, wherein said first strap mounting flange extends outwardly from one said side rail, and wherein said second strap mounting flange extends outwardly from the other said side rail.

4. The cyrogenic insulated pipe support of claim I wherein said cradle plate includes a main portion and two longitudinally opposed oppositely disposed end portions extending upwardly from said main portion.

5. The cyrogenic insulated pipe support of claim 4 wherein each said end portion includes a curved cradle sized to receive the insulated pipe.

6. The cyrogenic insulated pipe support of claim I wherein said base has a plurality of threaded studs extending upwardly from said top surface, wherein said thermal insulator block includes a plurality of mounting holes aligned to receive said plurality of threaded studs, wherein said cradle plate includes a plurality of mounting holes aligned to receive said plurality of threaded studs, and further comprising a plurality of threaded nuts mounted upon said plurality of threaded studs to lock a position of said insulator block and cradle plate to said base.

7. An insulated pipe support comprising:
   a base having a top surface, said base having at least one pair of laterally separated strap mounting flanges;
   a thermal insulator block positioned upon said base between said strap mounting flanges of said pair of laterally separated strap mounting flanges;
   a cradle plate positioned upon said thermal insulator block and thermally isolated from said base by said thermal insulator block, said cradle plate being configured to be coupled to an insulated pipe, and
   at least one mounting strap sized to wrap about a cladding about the insulated pipe, said mounting strap having mounting ends coupled to said strap mounting flanges;
   wherein said base includes a pair of spaced apart longitudinal side rails extending upwardly from said top surface; and
   wherein each side rail of said pair of spaced apart longitudinal side rails has one strap mounting flange of said pair of laterally separated strap mounting flanges.

8. An insulated pipe support comprising:
   a base having a top surface, said base having at least one pair of laterally separated strap mounting flanges;
   a thermal insulator block positioned upon said base between said strap mounting flanges of said pair of laterally separated strap mounting flanges;
   a cradle plate positioned upon said thermal insulator block and thermally isolated from said base by said thermal insulator block, said cradle plate being configured to be coupled to an insulated pipe, and
   at least one mounting strap sized to wrap about a cladding about the insulated pipe, said mounting strap having mounting ends coupled to said strap mounting flanges;
   wherein said base includes a pair of spaced apart longitudinal side rails extending upwardly from said top surface; and
   wherein said cradle plate includes a main portion and two longitudinally opposed oppositely disposed end portions extending upwardly from said main portion; and
   wherein each said end portion includes a curved cradle sized to receive a cyrogenic insulated pipe.

9. The cyrogenic insulated pipe support of claim 8 wherein each said end portion includes a curved cradle sized to receive the cyrogenic insulated pipe.

10. An insulated pipe support comprising:
    a base having a top surface, said base having at least one pair of laterally separated strap mounting flanges;
    a thermal insulator block positioned upon said base between said strap mounting flanges of said pair of laterally separated strap mounting flanges;
    a cradle plate positioned upon said thermal insulator block and thermally isolated from said base by said thermal insulator block, said cradle plate being configured to be coupled to an insulated pipe, and at least one mounting strap sized to wrap about a cladding about the insulated pipe, said mounting strap having mounting ends coupled to said strap mounting flanges;

wherein said base includes a pair of spaced apart longitudinal side rails extending upwardly from said top surface; and wherein said base has a plurality of threaded studs extending upwardly from said top surface, wherein said thermal insulator block includes a plurality of mounting holes aligned to receive said plurality of threaded studs, wherein said cradle plate includes a plurality of mounting holes aligned to receive said plurality of threaded studs, and further comprising a plurality of threaded nuts mounted upon said plurality of threaded studs to lock position of said insulator block and cradle plate to said base.

11. A cryogenic pipe support for use with an insulated pipe having a thermal insulation about the insulated pipe and cladding positioned about the insulation, said cyrogenic pipe support comprising:

a base having a top surface;

a thermal insulator base positioned upon said block;

a cradle plate positioned upon said thermal insulator block and thermally isolated from said base by said thermal insulator block, said cradle plate includes a main portion and two longitudinally opposed oppositely disposed end portions extending upwardly from said main portion, and each said end portion having a cradle sized to receive the insulated pipe, and at least one mounting strap sized to wrap about the cladding, said mounting strap having mounting ends coupled to said base.

12. The cyrogenic insulated pipe support of claim 11 wherein said base includes at least one pair of laterally separated strap mounting flanges.

13. The cyrogenic insulated pipe support of claim 11 wherein said base includes a pair of spaced apart longitudinal side rails extending upwardly from said top surface.

14. The cyrogenic insulated pipe support of claim 13 wherein each side rail of said pair of spaced apart longitudinal side rails has a strap mounting flange.

15. The cyrogenic insulated pipe support of claim 11 wherein said base has a plurality of threaded studs extending upwardly from said top surface, wherein said thermal insulator block includes a plurality of mounting holes aligned to receive said plurality of threaded studs, wherein said cradle plate includes a plurality of mounting holes aligned to receive said plurality of threaded studs, and further comprising a plurality of threaded nuts mounted upon said plurality of threaded studs to lock position of said insulator block and cradle plate to said base.

* * * * *